(12) United States Patent
Hattori et al.

(10) Patent No.: US 11,454,155 B2
(45) Date of Patent: Sep. 27, 2022

(54) EXHAUST SYSTEM

(71) Applicant: TOYOTA JIDOSHA KABUSHIKI KAISHA, Toyota (JP)

(72) Inventors: Shinichiro Hattori, Toyota (JP); Kozo Suzuki, Seto (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 536 days.

(21) Appl. No.: 16/166,583

(22) Filed: Oct. 22, 2018

(65) Prior Publication Data
US 2019/0195117 A1 Jun. 27, 2019

(30) Foreign Application Priority Data
Dec. 27, 2017 (JP) .............................. JP2017-250685

(51) Int. Cl.
| | | |
|---|---|---|
| *F01N 13/18* | (2010.01) | |
| *B60K 13/04* | (2006.01) | |
| *F01N 3/08* | (2006.01) | |
| *F01N 13/00* | (2010.01) | |
| *F01N 13/08* | (2010.01) | |

(52) U.S. Cl.
CPC .......... *F01N 13/1822* (2013.01); *B60K 13/04* (2013.01); *F01N 3/0814* (2013.01); *F01N 13/00* (2013.01); *F01N 13/009* (2014.06); *F01N 13/1805* (2013.01); *F01N 13/08* (2013.01); *F01N 2260/18* (2013.01); *F01N 2340/04* (2013.01); *F01N 2450/22* (2013.01); *F01N 2550/10* (2013.01)

(58) Field of Classification Search
CPC ..... B60K 13/04; F01N 13/1822; F01N 13/08; F01N 13/1805
See application file for complete search history.

(56) References Cited

U.S. PATENT DOCUMENTS

| | | | | |
|---|---|---|---|---|
| 4,907,666 A | * | 3/1990 | Tecco ..................... | B60K 13/04 180/309 |
| 8,910,472 B2 | * | 12/2014 | Takahashi ............... | F01N 13/10 60/323 |
| 9,388,719 B2 | * | 7/2016 | Kainuma ................ | F01N 1/084 |

(Continued)

FOREIGN PATENT DOCUMENTS

| | | |
|---|---|---|
| JP | S54-053119 U | 4/1979 |
| JP | 2003-003838 A | 1/2003 |
| JP | 2003-120282 A | 4/2003 |

(Continued)

OTHER PUBLICATIONS

Jul. 6, 2021 Office Action issued in Japanese Patent Application No. 2017-250685. (partial translation).

*Primary Examiner* — Anthony Ayala Delgado
(74) *Attorney, Agent, or Firm* — Oliff PLC

(57) ABSTRACT

An exhaust system including: an exhaust pipe including a straight portion, and a bent portion that is bent and extends from a downstream end of the straight portion; a muffler provided on a downstream side of the exhaust pipe; and a reinforcing member, wherein: the straight portion of the exhaust pipe is connected with an upstream end of the muffler through the bent portion; and the reinforcing member is provided so as to extend across a downstream end portion of the straight portion, and an upstream end portion of the muffler.

5 Claims, 5 Drawing Sheets

(56) References Cited

U.S. PATENT DOCUMENTS 10,787,943 B2 * 9/2020 Kishikawa ................ F01N 1/18
10,947,879 B2 * 3/2021 Kim .......................... F01P 3/12

FOREIGN PATENT DOCUMENTS

| JP | 2005-098224 A | 4/2005 |
| JP | 2011-127450 A | 6/2011 |
| JP | 2015-143497 A | 8/2015 |

* cited by examiner

EXHAUST SYSTEM

INCORPORATION BY REFERENCE

The disclosure of Japanese Patent Application No. 2017-250685 filed on Dec. 27, 2017 including the specification, drawings and abstract is incorporated herein by reference in its entirety.

BACKGROUND

1. Technical Field

The disclosure relates to an exhaust system.

2. Description of Related Art

Regarding a configuration of an exhaust system installed in a vehicle, there are various ideas in order to restrain deterioration of noise and vibration (NV) performance of a vehicle caused by vibration of the exhaust system that discharges exhaust gas from an engine to an outside For example, in Japanese Unexamined Patent Application Publication No. 2011-127450 (JP 2011-127450 A), an exhaust system of an internal combustion engine is proposed. The exhaust system includes a first exhaust pipe and a second exhaust pipe. The first exhaust pipe is connected with a right bank of a V-type engine and provided with a first main muffler, and the second exhaust pipe is connected with a left bank of the V-type engine and provided with a second main muffler. In the exhaust system, ball joints are arranged at positions, respectively, so that displacement of the first and second main mufflers is reduced when the mufflers are fluctuating up and down alternately about a roll axis.

SUMMARY

From a viewpoint of restraining vibration of an exhaust system, it is preferred to use a layout in which an exhaust pipe, a muffler, and so on included in the exhaust system lie linearly. However, depending on a vehicle type, there are instances where axes of the linear exhaust pipe and the muffler need to be offset due to a limitation of an on-vehicle space. In such instances, as a configuration which is often applied, for example, a straight portion of the exhaust pipe and the muffler are connected with each other through a bent portion that extends from a downstream end of the straight portion of the exhaust pipe (for example, see the tail pipe and the main muffler in FIG. 1 of JP 2011-127450 A).

In the above configuration in which the straight portion of the exhaust pipe and the muffler are connected with each other through the bent portion, there is a problem in that the bent portion is deformed when vibration is input to the exhaust pipe due to pulsation of an engine (shaking of the exhaust manifold and so on, and shaking by exhaust inertia), and relatively large vibration happens in the exhaust system due to the deformation of the bent portion. However, in the exhaust system described in JP 2011-127450 A, no consideration is given to vibration caused by a shape of the exhaust pipe (the bent portion). Therefore, there is a room for improvement.

In order to restrain deformation of the bent portion, pipe thickness of the exhaust pipe may be increased, or the bent portion may be fixed in a hanging manner by, for example, a firm bracket. This, however, causes problems in that a vehicle weight is increased, and also cost is increased due to a complex configuration.

The disclosure provides a technique regarding an exhaust system of a vehicle in which a straight portion of an exhaust pipe is connected with a muffler through a bent portion. With the technique, it is possible to restrain deformation of the bent portion and thus reduce vibration of the exhaust system with a simple configuration.

An aspect of the present disclosure relates to an exhaust system including: an exhaust pipe including a straight portion, and a bent portion that is bent and extends from a downstream end of the straight portion; a muffler provided on a downstream side of the exhaust pipe; and a reinforcing member, wherein: the straight portion of the exhaust pipe is connected with an upstream end of the muffler through the bent portion; and the reinforcing member is provided so as to extend across a downstream end portion of the straight portion, and an upstream end portion of the muffler.

With the configuration, the reinforcing member is provided across the downstream end portion of the straight portion and the upstream end portion of the muffler. Therefore, a transverse section of a segment between the downstream end of the straight portion of the exhaust pipe and the upstream end of the muffler (hereinafter, also referred to as a bent segment) is made of the bent portion, and the reinforcing member disposed at a distance from the bent portion. Hence, in comparison with a case where the bent segment includes the bent portion only, or a case where the reinforcing member is mounted on the bent portion directly, a second moment of area of the bent segment becomes higher. Therefore, without increasing a pipe thickness, it is possible to improve bending rigidity of the bent segment. This means that, in the exhaust system according to the aspect, the straight portion of the exhaust pipe and the muffler are connected with each other through the reinforcing member, thereby improving rigidity of the segment corresponding to the bent portion in the exhaust system. Accordingly, it is possible to restrain deformation of the bent portion and thus reduce vibration of the exhaust system with the simple configuration in which the reinforcing member is provided across the straight portion and the muffler.

In the above aspect, the reinforcing member may be formed so as to have an arc-shaped section that is curved along an outer periphery of the straight portion and an outer periphery of the muffler.

With the configuration, the reinforcing member is formed so as to have an arc-shaped section, in other words, a three-dimensional curved surface shape. Therefore, it is possible to ensure that bending rigidity of the bent segment is improved.

In the above aspect, the bent portion may be bent so as to separate from an axis of the straight portion towards the downstream side of the exhaust pipe; and the reinforcing member may be disposed so that a projecting direction of the arc-shaped section of the reinforcing member and a direction of the bent portion separating from the axis of the straight portion are opposite to each other.

With the configuration, the reinforcing member is disposed so that the projecting direction of the reinforcing member and the projecting direction of the bent portion are opposite to each other. Therefore, it is possible to efficiently set a mass (the reinforcing member) at a position separated from a centroid of the bent segment. Thus, it is possible to improve the second moment of area of the bent segment more reliably. Accordingly, it is ensured that deformation of the bent portion is restrained, thereby further reducing vibration of the exhaust system.

In the above aspect, a projecting bead may be formed in the reinforcing member, the projecting bead projecting to a side separating from the bent portion; and the projecting bead may extend in a direction extending across the straight portion and the muffler.

With the configuration, the projecting bead is formed in the reinforcing member, the projecting bead projecting to the side separating from the bent portion. Therefore, it is possible to efficiently set a mass (the projecting bead) at a position separated from the centroid of the bent segment. Thus, it is possible to further enhance the second moment of area of the bent segment. Moreover, since the projecting bead is formed so as to extend in a direction extending across the straight portion and the muffler, it is possible to improve bending rigidity throughout the entire length of the bent segment. Accordingly, deformation of the bent portion is restrained more reliably with the simple configuration in which the projecting bead is formed in the reinforcing member, thereby further reducing vibration of the exhaust system.

In the above aspect, a flange portion may be formed in the reinforcing member; and the flange portion may be a side edge portion of the reinforcing member that is bent in a direction separating from the bent portion and goes along the direction extending across the straight portion and the muffler.

With the configuration, the flange portion that is bent to the side separating from the bent portion is formed in the reinforcing member. Therefore, it is possible to further improve bending rigidity of the bent segment. Thus, with the simple configuration in which the flange portion is formed in the reinforcing member, deformation of the bent portion is restrained more reliably, thereby further reducing vibration of the exhaust system.

In an exhaust system of the vehicle, immediately after start of an engine, an exhaust pipe is cool and contracted in a longitudinal direction. Meanwhile, after the engine is warmed up, temperature of the exhaust pipe increases as the exhaust pipe receives heat from exhaust gas, and the exhaust pipe thus expands in the longitudinal direction. There is a difference in temperature between the exhaust pipe and a reinforcing member, and an expansion amount is also different between the exhaust pipe and the reinforcing member. Therefore, as the exhaust pipe repeatedly expands and contracts, connection between the exhaust pipe and the reinforcing member can break.

In the above aspect, the reinforcing member may be welded to the straight portion along a longitudinal direction of the straight portion.

With the configuration, the reinforcing member is welded along the longitudinal direction of the straight portion, in other words, along the expansion and contraction direction of the straight portion. Therefore, expansion and contraction of the straight portion is absorbed, thereby restraining breakage of the connection between the exhaust pipe and the reinforcing member.

As described so far, with the exhaust system according to the disclosure, it is possible to restrain deformation of the bent portion and reduce vibration of the exhaust system with the simple configuration.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
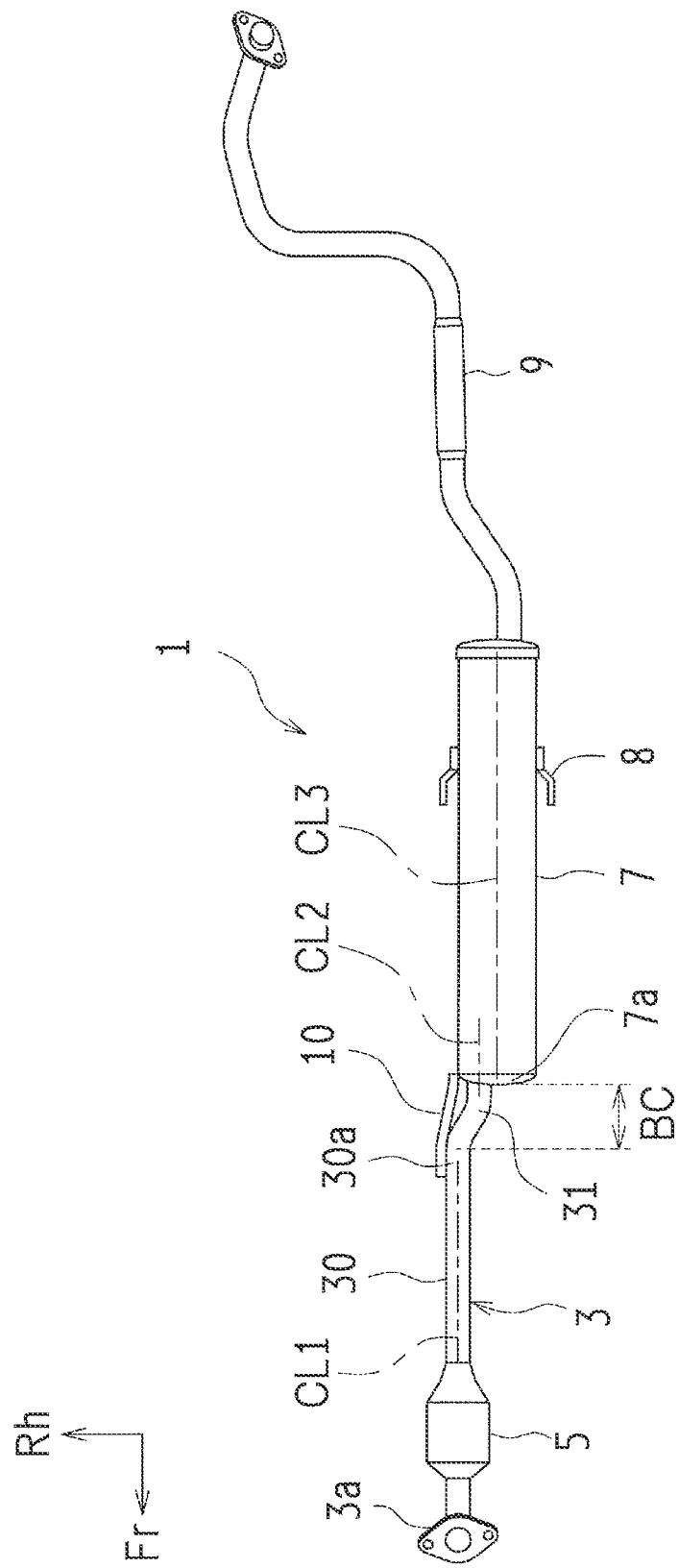
FIG. 1 is a schematic plan view of a main part of an exhaust system of a vehicle according to an embodiment of the disclosure.

Hereinafter, embodiments for carrying out the disclosure are described with reference to the drawings. In the drawings, an arrow Up represents an upper side, an arrow Fr represents a front side in a vehicle front-rear direction, and an arrow Rh represents a right side in a vehicle width direction.

Overall Configuration

Figure 2:
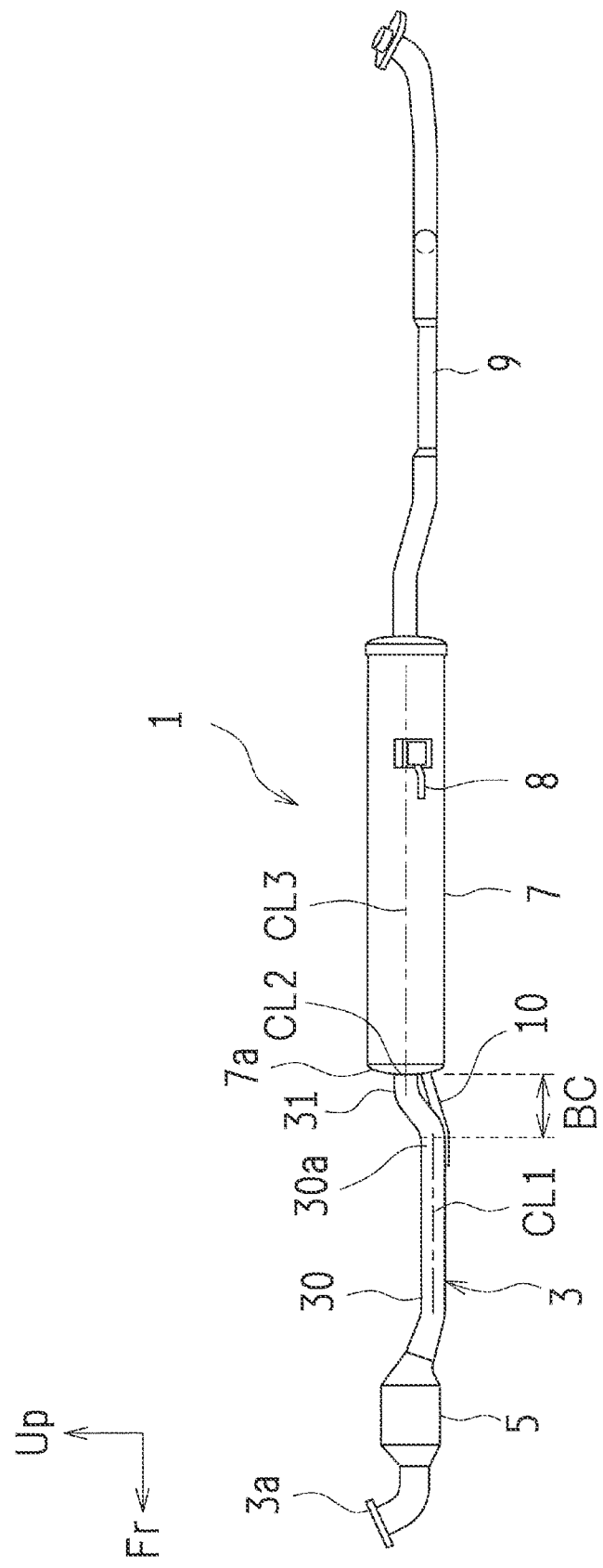
FIG. 2 is a side view of the main part of the exhaust system, seen from a left side in a vehicle width direction.

FIG. 1 is a schematic plan view of a main part of an exhaust system 1 of a vehicle according to an embodiment of the disclosure. FIG. 2 is a side view of the main part of the exhaust system 1, seen from a left side in the vehicle width direction. The exhaust system 1 reduces emission in the exhaust gas, muffles, and then discharges exhaust gas from an engine (not shown) to the atmosphere. As shown in FIG. 1 and FIG. 2, the exhaust system 1 includes a front pipe 3 connected with the engine, a catalytic converter 5, a main muffler 7, a rear pipe 9, a sub muffler (not shown), and a tail pipe (not shown).

The front pipe (the exhaust pipe) 3 is a metallic circular pipe, and is connected with an exhaust manifold (not shown) of the engine through an exhaust manifold joining portion 3a provided in an upstream end portion (a distal end portion) of the front pipe 3. In an intermediate portion of the front pipe 3, the catalytic converter 5 is provided. The catalytic converter 5 reduces emission in the exhaust gas from the engine by oxidizing unburnt components such as HC and CO contained in the exhaust gas by a reaction with $O_2$. Thus, emission in the exhaust gas discharged from the exhaust manifold is reduced by the catalytic converter 5.

The main muffler 7 is connected with a downstream side of the front pipe 3. The main muffler 7 has a cylindrical metal container extending in the vehicle front-rear direction, and is supported by a body (not shown) in a hanging manner through a support rubber 8 attached to the metal container. The main muffler 7 includes a resonant chamber (not shown) inside the metal container, and is configured so that exhaust sound at specific frequency excites Helmholtz resonance inside the resonant chamber, thereby reducing exhaust noise.

The rear pipe 9 is connected with a downstream side of the main muffler 7. The rear pipe 9 is a metallic circular pipe, and first extends straight to a rear side (to a rear side in the vehicle front-rear direction) from a downstream end (a rear end) of the main muffler 7. Then, the rear pipe 9 extends downwardly and also to the right side in the vehicle width direction at a slant towards the rear side, and then extends straight to the rear side again. Thereafter, the rear pipe 9 extends to the right side the vehicle width direction, and, from there, extends to the rear side while making a curve so as to expand to the right side in the vehicle width direction. Then, the rear pipe 9 extends upwardly to the rear side at a slant. The sub muffler that mainly reduces high frequency exhaust noise is connected with the downstream side of the rear pipe 9. Further, the tail pipe communicating with an outside (the atmosphere) is connected with a downstream side of the sub muffler.

In the exhaust system 1 configured as described above, exhaust gas discharged from the exhaust manifold of the engine into the front pipe 3 first pass through the catalytic converter 5 provided in the intermediate part of the front pipe 3 and get the emission reduced, and then reaches the main muffler 7 through the front pipe 3. After noise is reduced by the main muffler 7, the exhaust gas reaches the sub muffler through the rear pipe 9. Then, after high frequency noise, which cannot be reduced by the main muffler 7 only, is reduced by the sub muffler, the exhaust gas is discharged into the atmosphere through the tail pipe.

Connection Structure Between Front Pipe and Main Muffler

Next, a connection structure between the front pipe 3 and the main muffler 7 in the exhaust system 1 according to the embodiment is described.

As shown in FIG. 1 and FIG. 2, the front pipe 3 includes a straight portion 30 and a bent portion 31. The straight portion 30 extends straight in the vehicle front-rear direction on the downstream side of the catalytic converter 5. The bent portion 31 is bent from a downstream end of the straight portion 30 (see a broken line on the front side of a segment BC in the vehicle front-rear direction in FIG. 1 and FIG. 2) and extends to the rear side, and is connected with an upstream end (a front end) of the main muffler 7. In other words, the straight portion 30 is connected with the upstream end of the main muffler 7 through the bent portion 31. The bent portion 31 is bent so as to separate from an axis CL1 of the straight portion 30 towards the downstream side. To be more specific, from the downstream end of the straight portion 30, the bent portion 31 is bent and extends upwardly and also to a left side in the vehicle width direction towards the rear side. Then, the bent portion 31 extends straight to the rear side and is connected with the upstream end of the main muffler 7.

Here, the axis CL1 of the straight portion 30, an axis CL2 of a portion of the bent portion 31 extending straight and connected with the main muffler 7, and an axis CL3 of the main muffler 7 have a relation where the axis CL2 of the bent portion 31 is offset to the left side with respect to the axis CL1 of the straight portion 30 as shown in FIG. 1, and is also offset upwardly with respect to the axis CL1 as shown in FIG. 2. Also, the axis CL2 of the bent portion 31 is offset only to the right side with respect to an axis CL3 of the main muffler 7 as shown in FIG. 1. Therefore, the axis CL1 of the straight portion 30 is offset greatly to the right side with respect to the axis CL3 of the main muffler 7 as shown in FIG. 1, and is also offset downwardly with respect to the axis CL3 as shown in FIG. 2.

Thus, the front pipe 3 and the main muffler 7 are in a positional relation in which they are offset to each other in the vertical direction and the horizontal direction, and the front pipe 3 and the main muffler 7 are connected with each other through the bent portion 31 that is bent upwardly and also to the left side in the vehicle width direction. In such a configuration, when vibration is input to the front pipe 3 by pulsation of the engine (shaking of the exhaust manifold and so on, and shaking due to exhaust inertia), the bent portion 31 is deformed in two axis directions in vertical and horizontal directions, and, due to the deformation of the bent portion 31, relatively large vibration may happen to the exhaust system 1.

In particular, in a high engine rotation zone (for example, between around 5200 rpm and 6000 rpm), when resonance of vibration of a vehicle and vibration of the exhaust system 1 happens, abnormal sound (twanging sound) loud enough to be heard by an occupant can happen.

Here, in order to restrain deformation of the bent portion 31, it is considered to increase a pipe thickness of the front pipe 3, and to fix the bent portion 31 in a hanging manner by using a frame such as a firm bracket. Also, in order to restrain resonance of vibration of a vehicle and vibration of the exhaust system 1, it is considered to mount a dynamic damper serving as an antivibration device on the exhaust system 1. However, there are problems in that a vehicle weight is increased, and cost is increased due to a complex structure and an increase in the number of components.

Thus, in the exhaust system 1 according to the embodiment, the straight portion 30 and the main muffler 7 are connected with each other through a stay (a reinforcing member) 10. Hence, rigidity of a segment (hereinafter, referred to as a bent segment) BC between the downstream end (the rear end) of the straight portion 30 and the upstream end (the front end) of the main muffler 7 is improved.

Figure 3:
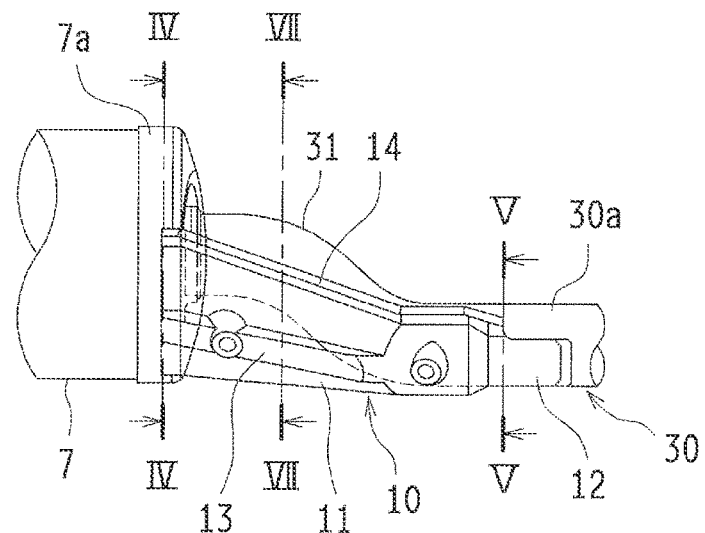
FIG. 3 is a perspective view of a stay, seen from a right side in the vehicle width direction.
Figure 4:
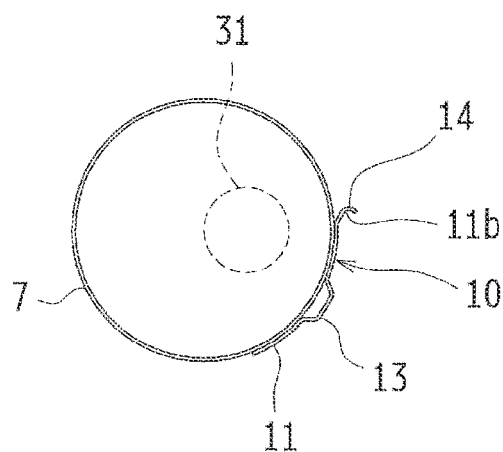
FIG. 4 is a sectional view taken along the arrows IV-IV in FIG. 3.
Figure 5:
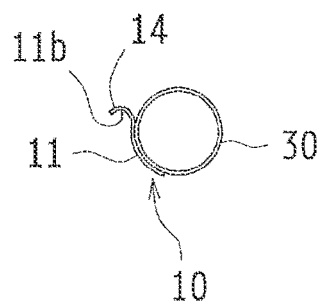
FIG. 5 is a sectional view taken along the arrows V-V in FIG. 3.
Figure 6:
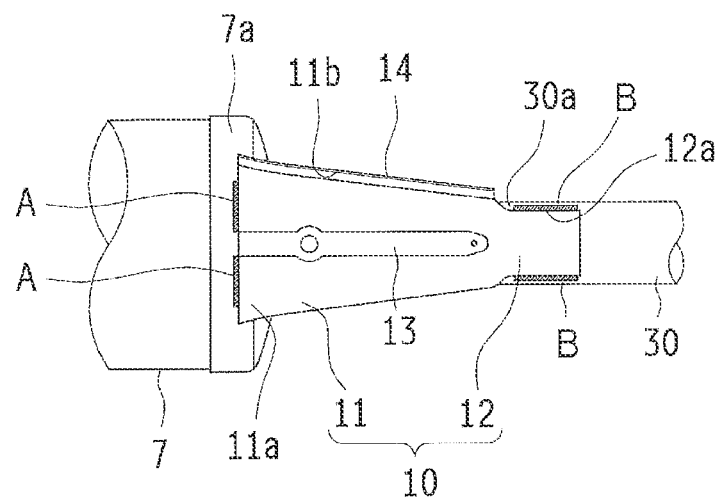
FIG. 6 is a view schematically describing a mounting structure of the stay.
Figure 7:
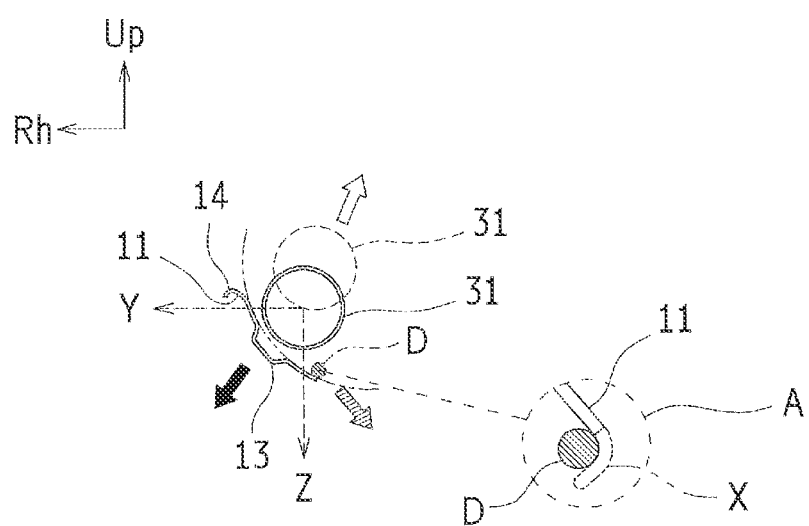
FIG. 7 is a view schematically showing a positional relation between a bent portion and the stay, taken along the line VII-VII in FIG. 3.

FIG. 3 is a perspective view of the stay 10, seen from the right side in the vehicle width direction. FIG. 4 is a sectional view taken along the arrows IV-IV in FIG. 3. FIG. 5 is a sectional view taken along the arrows V-V in FIG. 3. Also, FIG. 6 is a view schematically describing a mounting structure of the stay 10, and FIG. 7 is a view schematically showing a positional relation between the bent portion 31 and the stay 10, taken along the line VII-VII in FIG. 3. As shown in FIG. 3, the exhaust system 1 of a vehicle according to the embodiment includes the stay 10 that is provided across a downstream end portion 30a of the straight portion 30 and an upstream end portion 7a of the main muffler 7. The stay 10 has a stay body portion 11, and a mounting portion 12. The mounting portion 12 extends to the upstream side from an end portion on the upstream side (the front end portion) of the stay body portion 11.

As shown in FIG. 3 and FIG. 4, the stay body portion 11 is made of an almost trapezoidal metal plate that is formed so as to have an arc-shaped section curved along an outer periphery of the straight portion 30 that is the circular pipe, and an outer periphery of the cylindrical main muffler 7. Further, the mounting portion 12 is integrally formed with a front end portion of the stay body portion 11, and is made of a rectangular metal plate that is formed so as to have an arc-shaped section curved along the outer periphery of the straight portion 30 that is the circular pipe. Therefore, the stay 10 is formed so as to have an arc-shaped section as a whole, more specifically, a quarter arc-shaped section.

As shown in FIG. 7, the stay 10 is disposed so that a projecting direction (the black arrow in FIG. 7) of the stay 10 having the quarter arc-shaped section, and a projecting direction (an outlined arrow in FIG. 7) of the bent portion 31 become almost opposite. The bent portion 31 is bent so as to separate from the axis CL1 of the straight portion 30 towards the downstream side. More specifically, as described above, the bent portion 31 is bent upwardly and to the left side in the vehicle width direction (obliquely left and upward direction) towards the rear side from the downstream end of the straight portion 30. Therefore, the stay 10 is disposed on the lower side and to the right side in the vehicle width direction (obliquely right and downward direction) that is almost opposite to the bent portion 31. Hence, as shown in FIG. 7, in a view in the vehicle front-rear direction, the stay 10 is mounted on the downstream end portion 30a of the straight portion 30 and the upstream end portion 7a of the main muffler 7 at a position and place so that the stay 10 extends from almost right beside the bent portion 31 (the right side in the vehicle width direction) downwardly to the left at a slant while making a curve.

As shown in portions A in FIG. 6, in the stay 10, a rear edge portion 11a of the stay body portion 11 on the downstream side is mounted on the upstream end portion 7a of the main muffler 7 in a circumferential direction by metal inert gas (MIG) welding (arc welding). At the same time, as shown in portions B in FIG. 6, both side edge portions 12a of the mounting portion 12 are mounted on the straight portion 30 along a longitudinal direction (the vehicle front-rear direction) of the straight portion 30 by MIG welding.

As shown in FIG. 3, FIG. 4, and FIG. 7, in the stay body portion 11, a projecting bead 13 having an almost C-shaped section and projecting in a direction separating from the bent portion 31 is formed. The projecting bead 13 extends in a longitudinal direction (a direction extending across the straight portion 30 and the main muffler 7) of the stay 10.

Further, as shown in FIG. 3, FIG. 4, and FIG. 5, a flange portion 14 is formed in the stay body portion 11. The flange portion 14 is made by bending an upper side edge portion 11b in a direction separating from the bent portion 31. The upper side edge portion 11b goes along the vehicle front-rear direction (the direction extending across the straight portion 30 and the main muffler 7). The flange portion 14 is not formed in a lower side edge portion of the stay body portion 11.

In the exhaust system 1 configured as described so far, the stay 10 is provided across the downstream end portion 30a of the straight portion 30 and the upstream end portion 7a of the main muffler 7. Therefore, as shown in FIG. 7, a transverse section (a section orthogonal to the vehicle front-rear direction) of the bent segment BC between the downstream end of the straight portion 30 and the upstream end of the main muffler 7 includes the bent portion 31, and the stay 10 that is disposed at a distance from the bent portion 31. Thus, in comparison with a case where the bent segment BC includes the bent portion 31 only, or a case where the stay 10 is mounted on the bent portion 31 directly, a second moment of area of a section of the bent segment BC orthogonal to the vehicle front-rear direction becomes higher. Therefore, without increasing the pipe thickness of the front pipe 3, it is possible to improve bending rigidity of the bent segment BC in the vehicle front-rear direction.

In addition, since the stay 10 is formed so as to have the arc-shaped section, in other words, a three-dimensional curved surface shape, it is possible to improve bending rigidity of the bent segment BC in the vehicle front-rear direction more reliably.

Moreover, the stay 10 is disposed so that the projecting direction of the stay 10 is almost opposite to the projecting direction of the bent portion 31. Therefore, it is possible to set a mass (the stay 10) efficiently at a position separated from a centroid of the bent segment BC, and it is thus possible to enhance the second moment of area of the bent segment BC more reliably. Further, with the combination of efficiently setting the position of the stay 10 and forming the stay 10 so as to have the quarter arc-shaped section, the mass (the stay 10) is present in both a Y direction (the horizontal direction) and a Z direction (the vertical direction) with respect to the bent portion 31 as shown in FIG. 7. Therefore, it is possible to enhance the second moment of area of the bent segment BC in both the Y and Z directions. Thus, as described above, it is possible to restrain deformation of the bent portion 31 more reliably although the bent portion 31 is easily deformed in the two axis directions in the vertical and horizontal directions.

Also, in the stay 10, the projecting bead 13 projecting to the side separating from the bent portion 31 is formed. Therefore, it is possible to set a mass (the projecting bead 13) efficiently at a position separated from the centroid of the bent segment BC. Therefore, it is possible to enhance the second moment of area of the bent segment BC even further. Moreover, the projecting bead 13 is formed so as to extend in the longitudinal direction (the direction extending across the straight portion 30 and the main muffler 7) of the stay 10. Therefore, it is possible to improve bending rigidity of the bent segment BC throughout the entire length. Further, the flange portion 14 that is bent in the direction separating from the bent portion 31 is formed in the stay 10. Therefore, it is possible to improve bending rigidity of the bent segment BC even further throughout the entire length.

As described so far, with the exhaust system 1 according to the embodiment, the stay 10 is formed so as to have the quarter arc-shaped section, and has the projecting bead 13 and the flange portion 14, and the stay 10 is provided so as to extend across the downstream end portion 30a of the straight portion 30 and the upstream end portion 7a of the main muffler 7. With this simple configuration, bending rigidity of the bent segment BC is improved without increasing the pipe thickness of the front pipe 3, and it is thus ensured that deformation of the bent portion 31 is restrained. Accordingly, it is ensured that vibration of the exhaust system 1 is reduced.

In the exhaust system 1 of a vehicle, immediately after start of the engine, the front pipe 3 is cool and contracted in the longitudinal direction. Meanwhile, after the engine is warmed up, temperature of the front pipe 3 increases as the front pipe 3 receives heat from exhaust gas, and the front pipe 3 thus expands in the longitudinal direction. There is a difference in temperature between the front pipe 3 and the stay 10, and an expansion and contraction amount is also different between the front pipe 3 and the stay 10. Therefore, as the front pipe 3 repeatedly expands and contracts, connection between the front pipe 3 and the stay 10 could break. However, in the embodiment, as described earlier, the both side edge portions 12a of the mounting portion 12 of the stay 10 are welded by MIG welding along the longitudinal direction of the straight portion 30, in other words, the expansion and contraction direction of the straight portion 30. Thus, expansion and contraction of the straight portion 30 is absorbed, and it is ensured that breakage of the connection between the front pipe 3 and the stay 10 is restrained.

Further, in a view in the vehicle front-rear direction, the stay 10 is at a position so as to extends from almost right beside the bent portion 31 (the right side in the vehicle width direction) downwardly and to the left at a slant while making a curve. Therefore, as shown by a hatched arrow in FIG. 7, mud D and the like splashed by, for example, a tire is easily discharged and cannot accumulate easily. In addition, the flange portion 14 is provided only in the upper side edge portion 11b, and a flange portion X shown by an imaginary line (a two-dot chain line) in a portion A in FIG. 7 is not provided in the lower side edge portion. Thus, it is possible to restrain the mud D and the like from accumulating. Hence, in the embodiment, it is possible to restrain the stay 10 from rusting due to accumulation of mud.

Example

Described next is a result of test that was carried out in order to confirm effects of the exhaust system 1 of a vehicle according to the embodiment. In the description below, an example means the exhaust system 1, and a comparative example means the exhaust system 1 without the stay 10.

Figure 8:
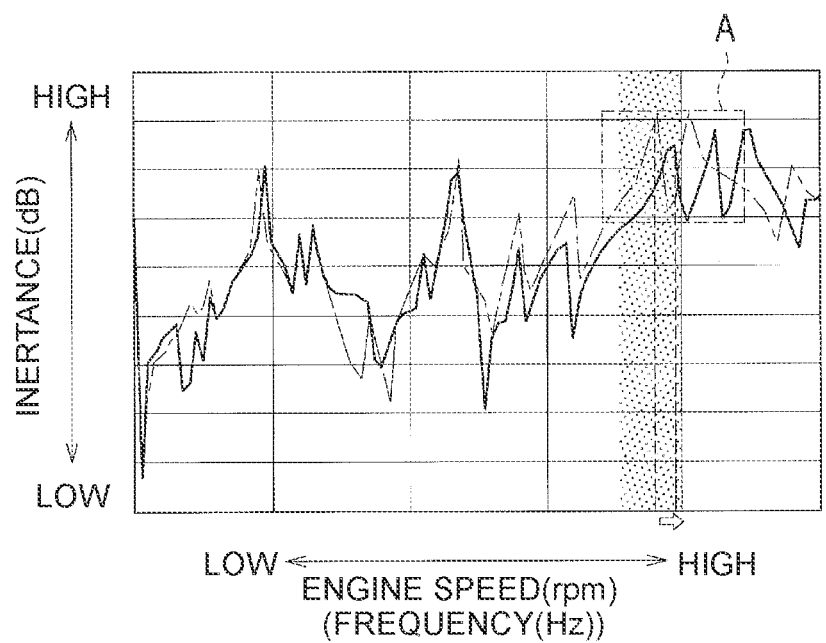
FIG. 8 is a graph schematically showing a relation between engine speed and inertance pertaining to the exhaust system.
Figure 9:
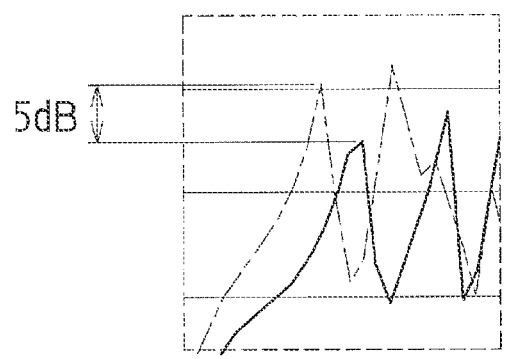
FIG. 9 is an enlarged view of a portion A in FIG. 8.

FIG. 8 is a graph schematically showing a relation between engine speed and inertance regarding the exhaust system 1, and FIG. 9 is an enlarged view of a portion A in FIG. 8. In FIG. 8 and FIG. 9, a solid line represents the example, and a one dot chain line represents the comparative example. In FIG. 8, the horizontal axis represents engine speed (rpm), and the vertical axis represents inertance (dB). However, there is a correlation between the engine speed (rpm) and frequency (Hz) (1 (rpm)≈30 (Hz)), and there is also a correlation between the inertance (dB) and a vibration level. Therefore, it can be said that FIG. 8 also shows a relation between engine speed and inertance.

As shown in FIG. 8, in the example, unlike the comparative example, it was found that a resonant frequency band could be shifted from a frequency band (a hatched portion in FIG. 8) in which resonance with vibration of a vehicle easily happens (see an outlined arrow in FIG. 8). Further, with the example, as shown in FIG. 9, it was found that, although this is just an example, the vibration level could be reduced by as much as 5 (dB) from that of the comparative example.

Based on above, it was confirmed that, with the exhaust system 1 of a vehicle according to the embodiment, it is possible to ensure that vibration of the exhaust system 1 is reduced with the simple configuration without increasing the pipe thickness of the front pipe 3. At the same time, it was also confirmed that resonance with vibration of a vehicle was restrained without using a dynamic damper and so on.

Other Examples

The disclosure is not limited to the embodiment, and may be carried out in various forms without departing from the spirit and the main characteristics of the disclosure.

In the embodiment, the disclosure is applied to the exhaust system 1 having the bent portion 31 that is bent in the vertical direction and the horizontal direction (the vehicle width direction). However, the disclosure is not limited to this, and the disclosure may be applied to, for example, an exhaust system having a bent portion that is bent only in the vertical direction or a bent portion that is bent only in the horizontal direction.

Further, in the embodiment, the stay 10 is mounted on the straight portion 30 and the main muffler 7 by MIG welding (arc welding). However, the disclosure is not limited to this, and the stay 10 may be mounted by, for example, bolt fastening, spot welding, and rivet.

Further, in the embodiment, the disclosure is applied to the front pipe 3 and the main muffler 7 disposed in a center portion of a vehicle. However, the disclosure is not limited to this, and may be applied to, for example, the rear pipe 9 and a main muffler disposed in a rear portion of a vehicle as long as the straight portion of the exhaust pipe is connected with the muffler through the bent portion.

Thus, the embodiment is just an example in all respects, and should not be interpreted attributively. Further, all modifications and changes within a scope equivalent to the claims are within the scope of the disclosure.

According to the disclosure, it is possible to restrain deformation of a bent portion and thus reduce vibration of an exhaust system with a simple configuration. Therefore, it is extremely advantageous to apply the disclosure to an exhaust system of a vehicle in which a straight portion of an exhaust pipe is connected with a muffler through the bent portion.

What is claimed is:

1. An exhaust system comprising:
    an exhaust pipe including a straight portion, and a bent portion that is bent and extends from a downstream end of the straight portion;
    a muffler provided on a downstream side of the exhaust pipe; and
    a vibration reducing reinforcing member for reducing vibration of the exhaust system, wherein:
    the straight portion of the exhaust pipe is connected with an upstream end portion of the muffler through the bent portion;
    the vibration reducing reinforcing member is provided such that one end of the vibration reducing reinforcing member is directly connected to an outer surface of the exhaust pipe at a downstream end portion of the straight portion, and an opposite end of the vibration reducing reinforcing member is connected to a surface of the upstream end portion of the muffler;
    the vibration reducing reinforcing member comprises a plate having a shape that is wider at the end of the vibration reducing reinforcing member connected to the surface of the upstream end portion of the muffler and tapered toward the end of the vibration reducing reinforcing member directly connected to the outer surface of the exhaust pipe; and
    the vibration reducing reinforcing member includes both
        a projecting bead having an approximately C-shaped section that projects in a direction separating from the bent portion, projects outside a circumference of the muffler at least at the end connected to a surface of the upstream end portion of the muffler, and extends in a direction extending across the straight portion and the muffler, and
        a flange portion along only one tapered side edge portion of the plate, the flange being bent in a direction separating from the bent portion and extending along the direction extending across the straight portion and the muffler.

2. The exhaust system according to claim 1, wherein the vibration reducing reinforcing member is formed so as to have an arc-shaped section that is curved along an outer periphery of the straight portion and an outer periphery of the muffler.

3. The exhaust system according to claim 2, wherein:
    the bent portion is bent so as to separate from an axis of the straight portion towards the downstream side of the exhaust pipe; and
    the vibration reducing reinforcing member is disposed so that a projecting direction of the arc-shaped section of the vibration reducing reinforcing member and a direction of the bent portion separating from the axis of the straight portion are opposite to each other.

4. The exhaust system according to claim 1, wherein the vibration reducing reinforcing member is welded to the straight portion along a longitudinal direction of the straight portion.

5. The exhaust system according to claim 1, wherein the one end of the vibration reducing reinforcing member that is directly connected to the outer surface of the exhaust pipe at a downstream end portion of the straight portion is connected directly to the outer surface of the exhaust pipe upstream from the muffler.

* * * * *